US012739111B2

(12) United States Patent
You et al.

(10) Patent No.: US 12,739,111 B2
(45) Date of Patent: Sep. 15, 2026

(54) KEY UPDATE METHOD, NETWORK ELEMENT, USER EQUIPMENT, AND STORAGE MEDIUM

(71) Applicant: ZTE Corporation, Shenzhen (CN)

(72) Inventors: Shilin You, Shenzhen (CN); Yuze Liu, Shenzhen (CN); Jiyan Cai, Shenzhen (CN); Zhen Xing, Shenzhen (CN); Jin Peng, Shenzhen (CN); Zhaoji Lin, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 305 days.

(21) Appl. No.: 18/683,504

(22) PCT Filed: Mar. 23, 2022

(86) PCT No.: PCT/CN2022/082520

§ 371 (c)(1),
(2) Date: Feb. 13, 2024

(87) PCT Pub. No.: WO2023/019944

PCT Pub. Date: Feb. 23, 2023

(65) Prior Publication Data

US 2024/0356745 A1 Oct. 24, 2024

(30) Foreign Application Priority Data

Aug. 18, 2021 (CN) ........................ 202110949003.X

(51) Int. Cl.
*H04L 9/08* (2006.01)

(52) U.S. Cl.
CPC .................................... *H04L 9/088* (2013.01)

(58) Field of Classification Search
CPC ... H04L 63/0428; H04L 63/08; H04L 63/061; H04L 67/02; H04L 67/306;
(Continued)

(56) References Cited

U.S. PATENT DOCUMENTS

| | | | | |
|---|---|---|---|---|
| 7,587,598 B2 * | 9/2009 | Ohba | H04L 63/08 | 713/169 |
| 7,917,758 B2 * | 3/2011 | Palekar | H04L 63/08 | 709/227 |

(Continued)

FOREIGN PATENT DOCUMENTS

| | | |
|---|---|---|
| CN | 109819439 A | 5/2019 |
| CN | 110830996 A | 2/2020 |

(Continued)

OTHER PUBLICATIONS

International Search Report and Written Opinion for International Application No. PCT/CN2022/082520, mailed Jun. 24, 2022.

(Continued)

*Primary Examiner* — Sharif E Ullah
(74) *Attorney, Agent, or Firm* — Wolf, Greenfield & Sacks, P.C.

(57) ABSTRACT

A key update method, a network element, user equipment, and a storage medium are disclosed. The method may include: sending an application key update request to a second network element according to a user identity in response to an application key corresponding to a key identifier carried in a session establishment request being invalid; and determining an updated application key according to a message associated with the application key update request.

18 Claims, 6 Drawing Sheets

(58) Field of Classification Search
CPC ... H04L 63/0861; H04L 63/102; H04L 65/60; H04L 9/0819; H04L 9/088; G06F 21/10; G06F 21/602; G06F 2221/2107; G06F 17/30867; G06F 21/105; H04N 21/4627; H04N 21/84; H04N 21/2353; H04N 21/2387; H04N 21/25816; H04N 21/233; H04N 21/23439; H04N 21/2393; H04N 21/4126; H04N 21/41407; G06N 3/086
USPC ........ 713/171, 150, 163, 181; 726/2, 21, 36; 380/255, 264, 276
See application file for complete search history.

(56) References Cited

U.S. PATENT DOCUMENTS 8,843,738 B2* 9/2014 Vos ........ H04L 69/22 709/224
9,026,784 B2* 5/2015 Buruganahalli ........ H04L 63/20 713/176
9,608,963 B2* 3/2017 Lu ........ H04L 63/0464
10,009,183 B2* 6/2018 Pahl ........ H04L 9/3247
10,162,943 B2* 12/2018 Park ........ H04L 63/08
11,051,161 B1* 6/2021 Wang ........ H04W 12/06
11,438,147 B2* 9/2022 Afanasyeva ........ H04L 9/3252
11,502,830 B2* 11/2022 Cannon ........ H04L 9/0819
2003/0174842 A1* 9/2003 Challener ........ H04L 63/061 380/277
2005/0132204 A1* 6/2005 Gouguenheim ........ G06F 21/10 713/193
2007/0057048 A1* 3/2007 Plotkin ........ H04L 63/0428 235/382
2008/0002829 A1* 1/2008 Forsberg ........ H04L 63/0428 380/247
2008/0109642 A1* 5/2008 Beutler ........ G06F 11/1637 712/225
2009/0328177 A1* 12/2009 Frey ........ H04L 9/3213 726/9
2010/0017615 A1* 1/2010 Boesgaard ........ G06F 21/606 713/176
2010/0257578 A1* 10/2010 Shukla ........ G06F 21/6218 726/1
2011/0145581 A1* 6/2011 Malhotra ........ H04L 9/3271 725/91
2012/0324552 A1* 12/2012 Padala ........ H04L 9/3213 726/6
2013/0198509 A1* 8/2013 Buruganahalli .... H04L 63/1408 713/151
2013/0219178 A1* 8/2013 Xiques ........ H04L 65/70 713/168
2013/0318358 A1* 11/2013 Wang ........ H04L 9/0866 713/182
2014/0079221 A1* 3/2014 McCallum ........ H04L 9/0822 380/277
2014/0331297 A1* 11/2014 Innes ........ H04L 63/0884 726/7
2015/0222697 A1* 8/2015 Bassiouny ........ H04L 65/65 709/203
2016/0021635 A1* 1/2016 Lee ........ H04W 12/04 455/411
2017/0316185 A1* 11/2017 Park ........ G06F 21/105
2019/0068361 A1* 2/2019 Ye ........ H04W 4/48
2020/0058341 A1* 2/2020 Villa ........ G11C 11/2257
2020/0275270 A1* 8/2020 Kang ........ H04W 76/10
2020/0329514 A1* 10/2020 Yu ........ H04W 8/02
2020/0359212 A1* 11/2020 Chen ........ H04L 63/102
2020/0359218 A1* 11/2020 Lee ........ H04W 12/63
2021/0014052 A1* 1/2021 Tian ........ H04L 9/0897
2022/0007182 A1* 1/2022 Stojanovski ........ H04W 12/037
2022/0060450 A1* 2/2022 Slovetskiy ........ H04L 67/142
2022/0070649 A1* 3/2022 Sahin ........ H04L 65/1016

FOREIGN PATENT DOCUMENTS

CN 112512043 A 3/2021
CN 113016202 A 6/2021
CN 113163402 A 7/2021
EP 3 661 146 B1 10/2022
WO WO 2012/174874 A1 12/2012
WO WO 2021/093164 A1 5/2021

OTHER PUBLICATIONS

First Office Action for Japanese Application No. 2024-506211, mailed Jan. 7, 2025.

[No Author Listed], Discussion on Refresh of KAF & KAKMA. 3GPP TSG-SA3 Meeting #103-e, Samsung Discussion. May 17-28, 2021;S3-212073:1-4.

Extended European Search Report for European Application No. 22857263.2, dated Jun. 30, 2025.

[No Author Listed], Samsung: Discussion paper to support AKMA progress. 3GPP TSG-SA3 Meeting #98Bis-e, Apr. 14-17, 2020;S3-200703:1-3.

[No Author Listed], Refresh of KAKMA and KAF. 3GPP TSG-SA3 Meeting #104-e, Aug. 16-27, 2021;S3-212902:1-4.

First Examination Report for Indian Patent Application No. 202417014606, dated May 22, 2026.

* cited by examiner

KEY UPDATE METHOD, NETWORK ELEMENT, USER EQUIPMENT, AND STORAGE MEDIUM

CROSS-REFERENCE TO RELATED APPLICATION

This application is a national stage filing under 35 U.S.C. § 371 of International Patent Application Serial No. PCT/CN2022/082520, filed Mar. 23, 2022, which claims priority to Chinese patent application No. 202110949003.X, filed Aug. 18, 2021. The contents of these applications are incorporated herein by reference in their entirety.

TECHNICAL FIELD

The present disclosure relates to the field of wireless communication network technologies, and in particular, to a key update method, a network element, a user equipment, and a storage medium.

BACKGROUND

A 5th Generation (5G) network architecture includes several network functions (NFs). For example, a Unified Data Management (UDM) network element is a permanent storage place of user subscription data and is located in a home network to which a user subscribes. An Access Management Function (AMF) network element can manage demands of users for access to the network, and is responsible for the management of Non-Access Stratum (NAS) signaling from devices to the network, user mobility management, and other functions. The AMF network element further has a security anchor function, and receives an intermediate key (denoted as $K_{AMF}$) and a Key Set Identity (KSI) established for a UE authentication process through interaction with an Authentication Server Function (AUSF) network element and a User Equipment (UE), thereby acquiring security-related data from the AUSF. An Application Function (AF) network element manages a session of the UE. In addition, the 5G network architecture also introduces an Authentication and Key Management for Applications (AKMA) Anchor Function (AAnF) entity, which is located in the home network and is mainly used to generate a session key between a UE and an AF entity and maintain a security context with the UE. The AKMA technology provides end-to-end security protection from users to applications for 5G networks.

After the UE initiates an application session establishment request to the AF, the AF may request the AAnF for a corresponding application key according to a key identifier carried in the application session establishment request. The application key is generated by the AAnF using an AKMA key and an application server identifier. Key generation function parameters of the application key only involve two parameters, namely, the application server identifier and the AKMA key. When the application key is invalid, the AF cannot obtain the correct application key, the application session cannot be safely carried out, so the user cannot obtain a reliable service.

SUMMARY

The present disclosure provides a key update method, a network element, a user equipment, and a storage medium.

An embodiment of the present disclosure provides a key update method, applied to a first network element. The method may include: sending an application key update request to a second network element according to a user identity in response to an application key corresponding to a key identifier carried in a session establishment request being invalid; and determining an updated application key according to a message associated with the application key update request.

An embodiment of the present disclosure provides a key update method, applied to a second network element. The method may include: receiving an application key update request sent by a first network element according to a user identity; and sending, according to the application key update request, indication information for updating an application key.

An embodiment of the present disclosure provides a key update method, applied to a user equipment. The method may include: receiving indication information for updating an application key; and updating an invalid application key according to the indication information.

An embodiment of the present disclosure further provides a network element, which may include a memory, a processor, and a computer program stored in the memory and executable by the processor. The computer program, when executed by the processor, causes the processor to implement the key update method applied to a first network element or the key update method applied to a second network element.

An embodiment of the present disclosure provides a user equipment, which may include a memory, a processor, and a computer program stored in the memory and executable by the processor. The computer program, when executed by the processor, causes the processor to implement the key update method applied to a user equipment.

An embodiment of the present disclosure further provides a computer-readable storage medium, storing a computer program which, when executed by a processor, causes the processor to implement the key update method described above.

DETAILED DESCRIPTION

The present disclosure is further described below with reference to the accompanying drawings and embodiments.

It should be understood that the specific embodiments described herein are merely used for illustrating the present disclosure, and shall not be intended to limit the present disclosure. It is to be noted that the embodiments and features therein in the present disclosure may be combined with each other if not in collision. In addition, it should be noted that, for the convenience of description, the drawings only show some but not all the structures related to the present disclosure.

In an AKMA scenario, when a UE accesses a 5G network, and after 5G-Authentication and Key Agreement (AKA), i.e., 5G-AKA, or Extensible Authentication Protocol-AKA', i.e., EAP-AKA', authentication is successful, an intermediate key (denoted as $K_{AUSF}$) is generated at an AUSF and a Mobile Equipment (ME). An AKMA anchor key $K_{AKMA}$, as well as a key identifier A-KID associated with the AKMA anchor key $K_{AKMA}$, can be derived from the key $K_{AUSF}$.

Figure 1:
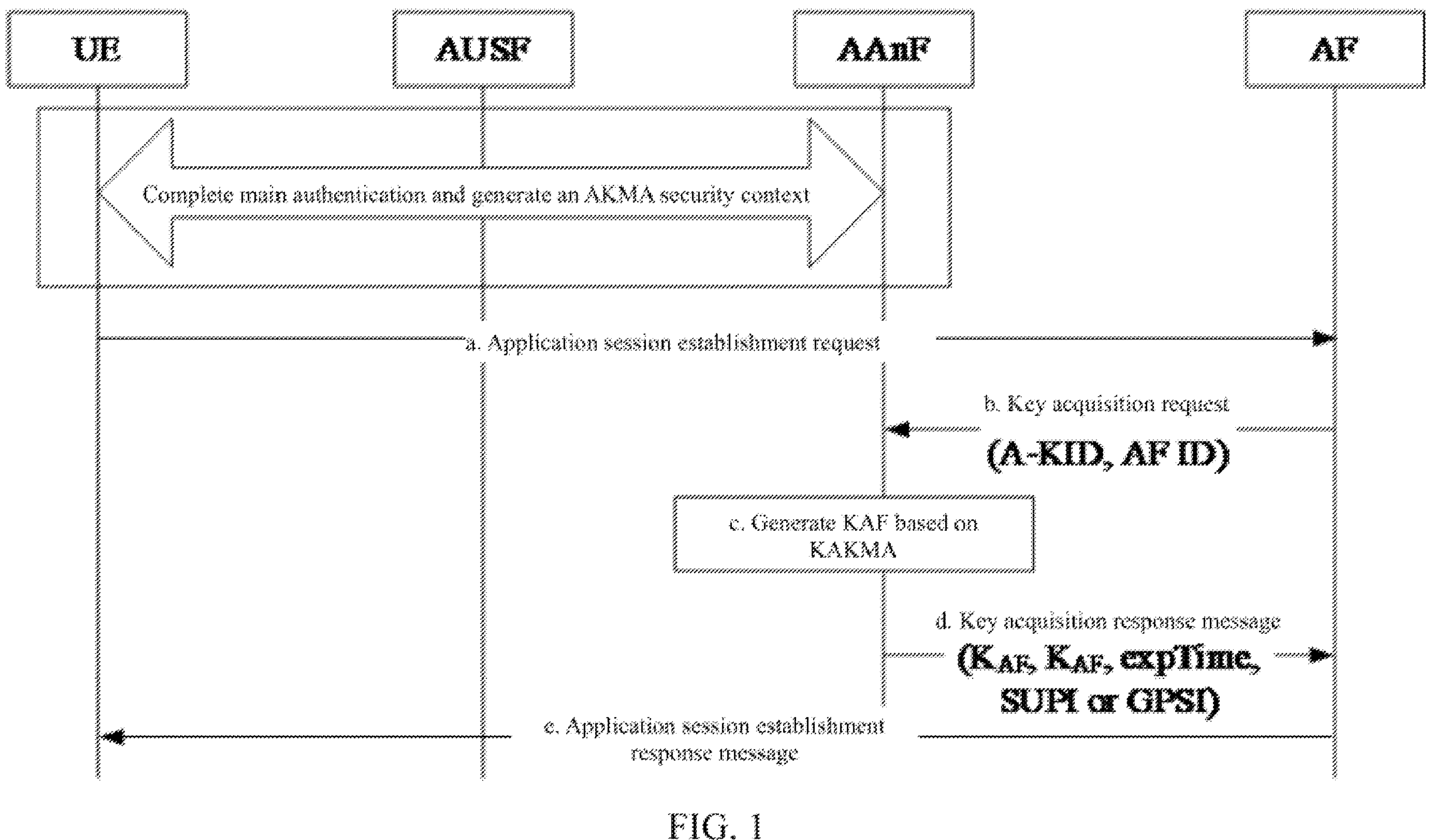
FIG. 1 is a schematic diagram of generating an application key according to an embodiment.

FIG. 1 is a schematic diagram of generating an application key according to an embodiment. As shown in FIG. 1, a UE (or an ME) first implements a main authentication process with an AAnF, derives $K_{AKMA}$ from $K_{AUSF}$, and generates A-KID. Based on this, a process of generating an application key includes the following operations.

a. The UE initiates an application session establishment request, which carries the A-KID generated by the UE, to an AF.

b. If the AF does not find a context related to the A-KID and the AF is located in an operator network, the AF sends a key acquisition request (Naanf_AKMA_ApplicationKey_Get Request), which carries the A-KID received by the AF and an identifier AF ID of the AF, to the AAnF. If the AF belongs to a third-party application and is located outside the operator network, the AF may send the key acquisition request to the AAnF through a Network Explosion Function (NEF).

c. The AAnF generates $K_{AF}$ based on $K_{AKMA}$ after receiving the key acquisition request sent by the AF (or by the AF through the NEF). To be specific, $K_{AF}$=KDF(AF ID, $K_{AKMA}$), where KDF represents a key generation function.

d. The AAnF sends a key acquisition response message (Naanf_AKMA_ApplicationKey_Get Response), which includes the generated $K_{AF}$ and a corresponding expiration time (expTime), to the AF. If the AF is located in the operator network, the response message further carries a Subscription Permanent Identifier (SUPI) or a Generic Public Subscription Identifier (GPSI). If the AF belongs to a third-party application and is located outside the operator network, the AAnF may send the response message carrying a GPSI to the AF through the NEF.

e. The AF sends an application session establishment response message to the UE.

In the above process of generating an application key, because key generation function parameters of the application key $K_{AF}$ only involve two parameters, namely, AF ID and $K_{AKMA}$, the AF cannot update $K_{AF}$ when a validity period of $K_{AF}$ expires or $K_{AF}$ is invalid, resulting in a failure in establishing an application session, thereby failing to ensure the quality of service.

In an embodiment of the present disclosure, a key update method is provided. The method may be applied to a first network element which is a network element for managing a session of a UE, such as an AF.

Figure 2:
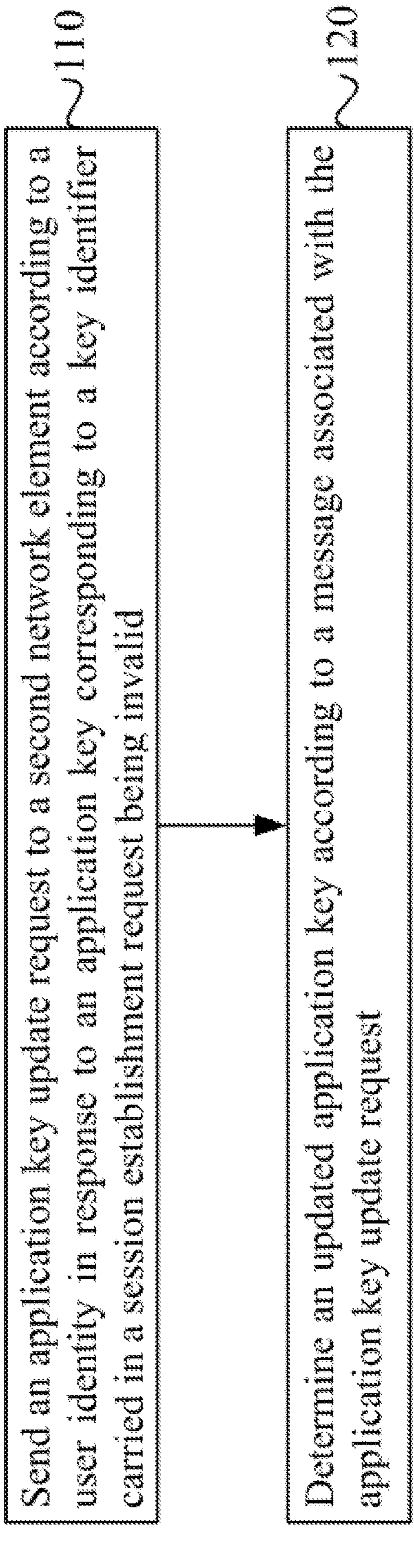
FIG. 2 is a flowchart of a key update method according to an embodiment.

FIG. 2 is a flowchart of a key update method according to an embodiment. As shown in FIG. 2, the method provided in this embodiment includes the following steps 110 to 120.

In a step of 110, an application key update request is sent to a second network element according to a user identity when an application key corresponding to a key identifier carried in a session establishment request is invalid.

In this embodiment, the UE initiates a session establishment request carrying a key identifier A-KID to a first network element. The the first network element may query a corresponding application key $K_{AF}$ according to the A-KID. When $K_{AF}$ is invalid, for example, when a validity period of $K_{AF}$ expires, or a service provider considers $K_{AF}$ to be insecure, the first network element sends an application key update request, which carries a user identity for indicating the UE that requests to establish an application session, to the second network element. The user identity may be an SUPI or a GPSI. The second network element is a network element for storing user subscription data, such as a UDM.

In a step of 120, an updated application key is determined according to a message associated with the application key update request.

In this embodiment, the message associated with the application key update request may be a key update response message returned by the second network element. The key update response message is used for instructing the first network element to update $K_{AF}$ with a specified parameter. In addition, the second network element may be configured to further instruct the UE to update $K_{AF}$ using the specified parameter, to ensure that the application key used by the UE is consistent with the application key used by the first network element. Alternatively, the message associated with the application key update request may be a session establishment request re-initiated after the UE completes a re-registration process. In the re-registration process, the UE and the AUSF have already generated A-KID' and $K_{AKMA}$'. The AAnF generates $K_{AF}$' based on $K_{AKMA}$'. After receiving the session establishment request re-initiated by the UE, the first network element may acquire the updated application key $K_{AF}$' from the AAnF again according to the A-KID'.

According to the key update method of this embodiment, when an application key is invalid, the second network element may be requested for an updated application key, and the updated application key is determined according to the message associated with the application key update request, thereby ensuring the security of the application session and the service reliability.

In an embodiment, the method further includes a following step.

In a step of 100, a key update parameter is generated, and carried in the application key update request.

In this embodiment, the first network element generates a key update parameter for updating an application key, and the key update parameter is carried in an application key update request. Based on this, the second network element can notify the UE of the key update parameter, such that the UE updates $K_{AF}$ based on the key update parameter, thereby ensuring that the application key used by the UE is consistent with the application key used by the first network element. In some embodiments, the first network element may update $K_{AF}$ when it is determined that the UE has obtained the key update parameter. For example, when the UE returns an acknowledgment message to the second network element and the second network element returns an application key update response message to the first network element, the first network element updates the $K_{AF}$, to further ensure that the application key used by the UE is consistent with the application key used by the first network element.

In an embodiment, the message associated with the application key update request includes an application key update response message sent by the second network element.

In the step of 120, determining an updated application key according to a message associated with the application key update request includes: determining the updated application key based on the key update parameter when the application key update response message sent by the second network element is received.

In this embodiment, the message associated with the application key update request may be a key update response message returned by the second network element. The key update response message is used for instructing the first network element to update $K_{AF}$ using a specified parameter (i.e., the key update parameter). When finding that $K_{AF}$ corresponding to the A-KID is invalid, the first network element may generate a key update parameter, which may be a random number, denoted as $RAND_{AF}$. The AF initiates an application key update request to the second network element according to the user identity (GPSI or SUPI), and the message carries the user identity and the $RAND_{AF}$. When receiving an application key update response message sent by the second network element, the first network element updates $K_{AF}$ using the $RAND_{AF}$. Based on this, the second network element may further initiate a UE parameter update request to the UE. The UE parameter update request carries the $RAND_{AF}$ to instruct the UE to update $K_{AF}$ using the $RAND_{AF}$.

In an embodiment, determining the updated application key based on the key update parameter includes: performing an operation according to the key update parameter and the invalid application key using a key generation function to obtain the updated application key.

In this embodiment, an operation may be performed to $RAND_{AF}$ and the invalid $K_{AF}$ using the key generation function (KDF) that generates $K_{AF}$ based on $K_{AKMA}$, to obtain an updated application key $K_{AF}'$. For example, the updated application key may be obtained in the following manner: $K_{AF}'=KDF(RAND_{AF}, K_{AF})$.

In an embodiment, the method further includes a following step. In a step of 130, a validity period of the updated application key is configured.

In this embodiment, the first network element configures a validity period for the updated application key $K_{AF}'$. In the validity period, the $K_{AF}'$ can be used for establishment of an application session. If the validity period expires, the $K_{AF}'$ is invalid and cannot be used for the establishment of an application session. In this way, the session security is ensured.

In an embodiment, the key update parameter is a random number generated by a hash function.

In an embodiment, in the step of 110, sending an application key update request to a second network element according to a user identity includes: sending the application key update request to the second network element through a NEF network element when the first network element is located outside an operator network. Based on this, the first network element outside the operator network can also implement application key update.

Figure 3:
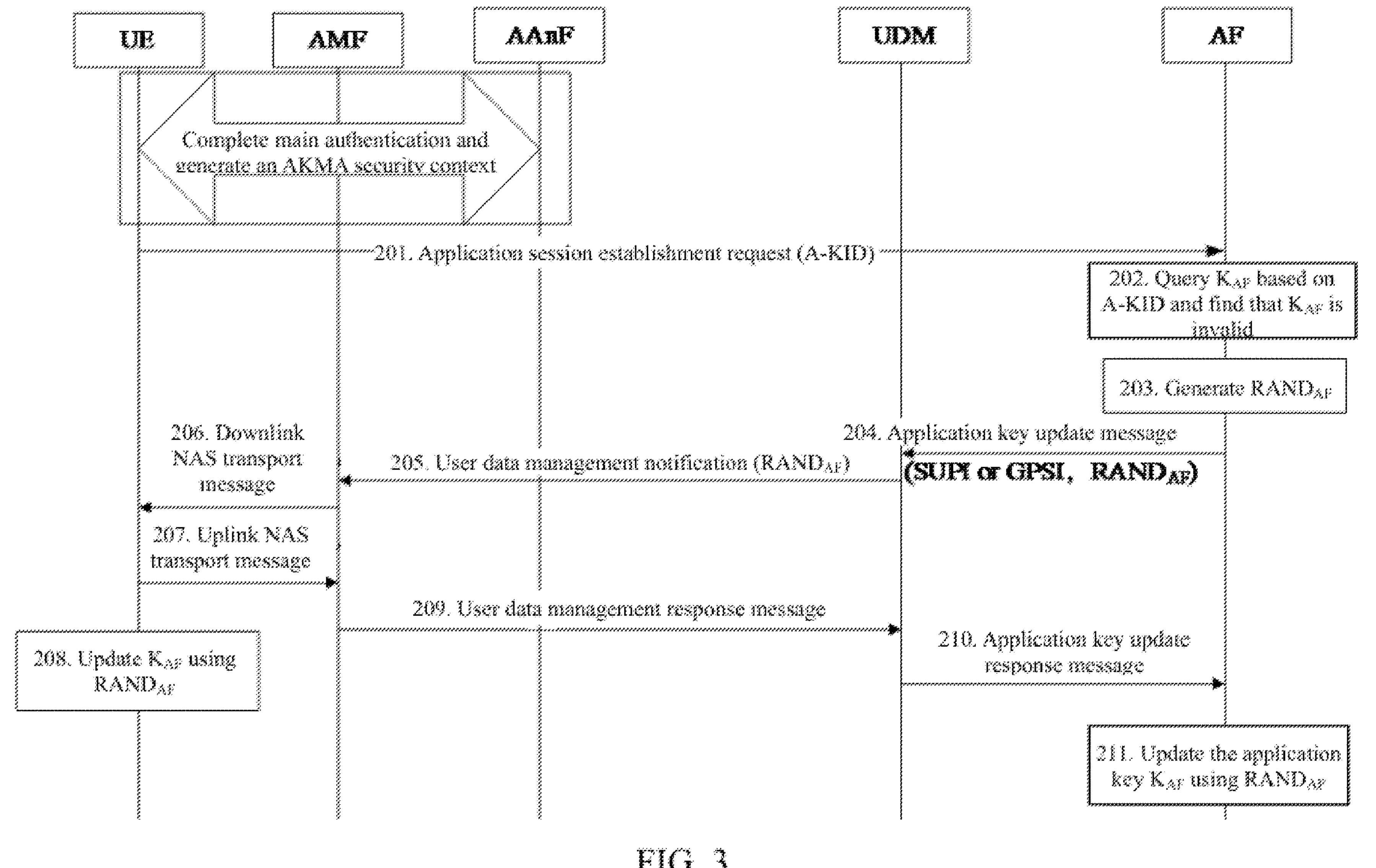
FIG. 3 is a schematic diagram of implementation of a key update method according to an embodiment.

FIG. 3 is a schematic diagram of implementation of a key update method according to an embodiment. As shown in FIG. 3, the first network element is an AF and the second network element is a UDM. A UE first implements a main authentication process with an AAnF, derives $K_{AKMA}$ from $K_{AUSF}$, and generates A-KID. Based on this, a key update process mainly includes the following operations that: when finding that $K_{AF}$ corresponding to A-KID is invalid, the AF generates a key update parameter $RAND_{AF}$; the AF sends an application key update request t carrying the user identity and the $RAND_{AF}$ to the UDM according to a user identity; the UDM sends a UE parameter update request carrying the $RAND_{AF}$ to the UE; the UE updates $K_{AF}$ using the $RAND_{AF}$ to obtain $K_{AF}'$; and the AF updates $K_{AF}$ using the $RAND_{AF}$ to obtain $K_{AF}'$, and sets a validity period for the $K_{AF}'$. Details are given as follows.

In a step of 201, the UE initiates an application session establishment request, which carries the A-KID generated by the UE, to an AF.

In a step of 202, the AF finds that $K_{AF}$ corresponding to the A-KID is invalid, for example, the validity period of $K_{AF}$ expires or a service provider considers $K_{AF}$ to be insecure, and the AF sets the $K_{AF}$ to invalid.

In a step of 203, the AF generates an application key update parameter $RAND_{AF}$, which may be a random number generated by a hash function.

In a step of 204, the AF sends an application key update message (Nudm_APP_Key_Update Request) carrying the $RAND_{AF}$ to the UDM according to the user identity. In addition, if the AF is located in an operator network, the application key update message further carries the user identity (SUPI or GPSI). If the AF is a third-party application and is located outside the operator network, the AF may alternatively send the application key update message carrying a GPSI to the UDM through an NEF.

In a step of 205, the UDM initiates a UE parameter update process, for example, sends a user data management notification (Nudm_SDM_Notification) carrying the key update parameter $RAND_{AF}$ to the AMF. In an embodiment, the user data management notification may include a reply indication for indicating that the UE needs to return an acknowledgment message (ACK).

In a step of 206, the AMF sends a downlink NAS transport message (DL NAS TRANSPORT) to the UE. The downlink NAS transport message includes a transparent container received from the UDM. The UE verifies the key update parameter of the UDM. If a security check on the key update parameter of the UDM is successful, the UE stores the key update parameter and starts to use $RAND_{AF}$ from this location, or forwards the key update parameter to a Universal Subscriber Identity Module (USIM). If the security check fails, the UE discards contents of the key update parameter.

In a step of 207, if the UE has determined the key update parameter and the UDM has requested the UE to send an ACK to the UDM, the UE sends an uplink NAS transport message (UL NAS TRANSPORT), which carries a transparent container including the ACK, to the AMF.

In a step of 208, the UE updates $K_{AF}$ using the $RAND_{AF}$, for example, $K_{AF}'=KDF(RAND_{AF}, K_{AF})$.

In a step of 209, if the uplink NAS transport message received by the AMF carries the ACK, the AMF sends a user data management response message (Nudm_SDM_Info), which carries a transparent container including the ACK, to the UDM.

In a step of 210, the UDM returns an application key update response message (Nudm_APPKey_Update Response) to the AF (through an NEF or not).

In a step of 211, the AF updates the application key $K_{AF}$ using the $RAND_{AF}$, for example, $K_{AF}'=KDF(RAND_{AF}, K_{AF})$. In addition, the AF may set a validity period for $K_{AF}'$.

After the UE and the AF generate the $K_{AF}'$, the $K_{AF}'$ may be used for session communication. In this embodiment, the AF may further return an application session establishment request response message to the UE.

It can be understood that steps 207 and 209 may be omitted if the user data management notification does not include the reply indication.

In an embodiment, the message associated with the application key update request includes a session establishment request message re-initiated by a user equipment.

Additionally, determining an updated application key according to a message associated with the application key update request includes: querying the updated application key according to the re-initiated session establishment request message.

In this embodiment, the message associated with the application key update request may be a session establishment request message re-initiated by the UE, and the re-initiated session establishment request message instructs the first network element to obtain the updated application key. For example, when finding that $K_{AF}$ corresponding to the A-KID is invalid, the first network element may initiate an application key update request to the second network element according to the user identity (GPSI or SUPI). The second network element may initiate a UE parameter update request carrying a re-registration indication and an application key update indication to the UE. The UE initiates a re-registration process, and generates new $K_{AKMA}'$, A-KID', and $K_{AF}'$ after the re-registration process. The UE sends a new session establishment request message using the A-KID'. After receiving the new session establishment request message, the first network element may query $K_{AF}'$ according to the A-KID' in the new session establishment request message.

In addition, before initiating the re-registration process, the UE may set a key set identity (ngKSI) to a specified value for indicating that an application key is invalid or a network layer key is invalid.

In an embodiment, the method further includes a following step. In a step of 112, a session establishment failure message is sent to the user equipment when an application key update response message sent by the second network element is received.

In this embodiment, the first network element may send a session establishment failure message to the UE when receiving an application key update response message sent by the second network element, and the UE may initiate a re-registration process when receiving the session establishment failure message.

Figure 4:
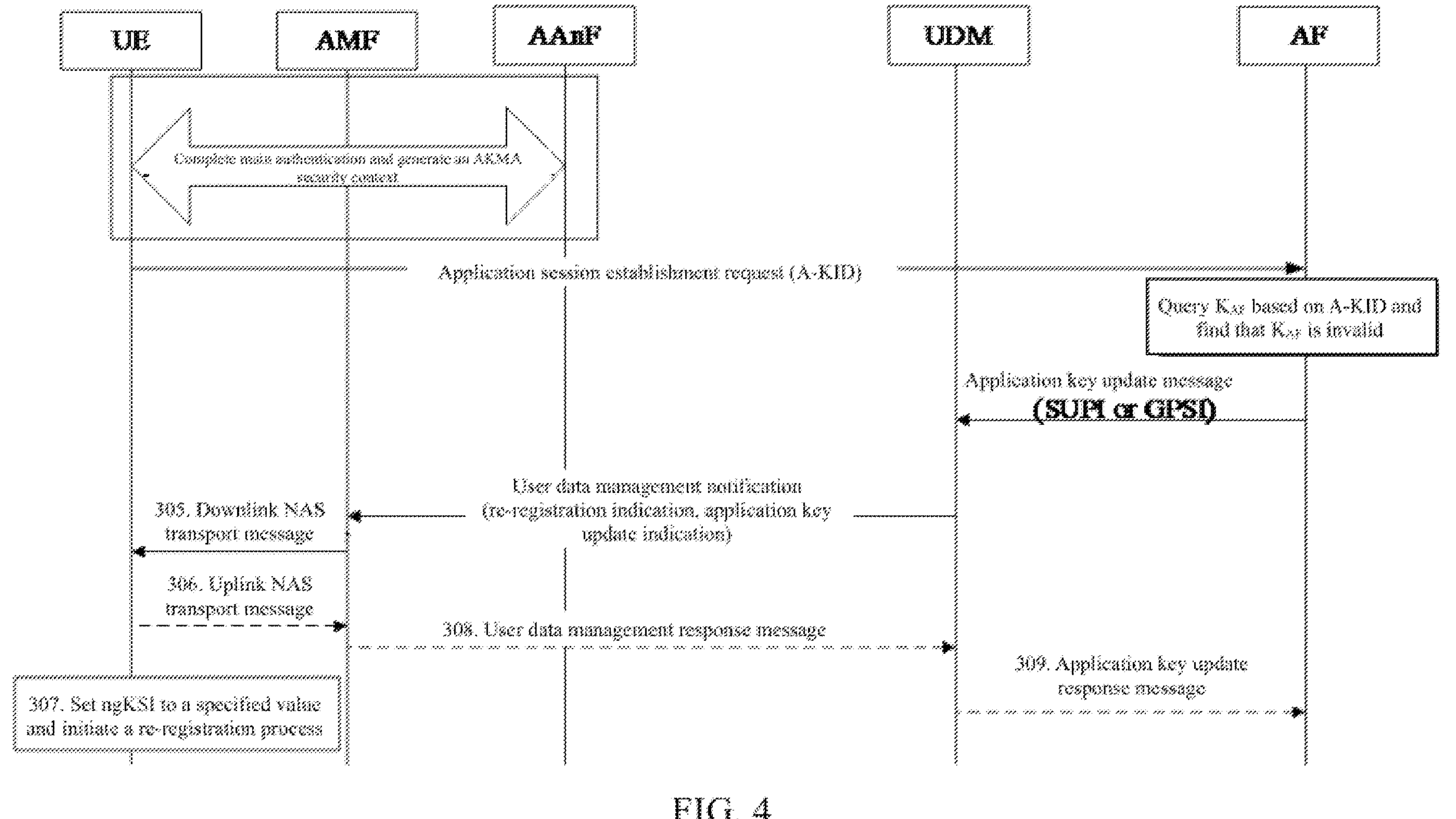
FIG. 4 is a schematic diagram of implementation of another key update method according to an embodiment.

FIG. 4 is a schematic diagram of implementation of another key update method according to an embodiment. As shown in FIG. 4, the first network element is an AF and the second network element is a UDM. A UE first implements a main authentication process with an AAnF, derives $K_{AKMA}$ from $K_{AUSF}$, and generates A-KID. Based on this, a key update process mainly includes the following operations that: when finding that $K_{AF}$ corresponding to the A-KID is invalid, the AF initiates an application key update request to the UDM according to a user identity (GPSI or SUPI); the UDM initiates a UE parameter update request carrying a re-registration indication and an application key update indication to the UE; and the UE changes ngKSI to invalid, and carries the ngKSI to initiate a re-registration process to the network. The specific process is as follows.

In a step of 301, the UE initiates an application session establishment request, which carries the A-KID generated by the UE, to the AF.

In a step of 302, the AF finds that the application key $K_{AF}$ corresponding to the A-KID is invalid. It means that the validity period of $K_{AF}$ expires or a service provider considers $K_{AF}$ to be insecure, and the AF sets the $K_{AF}$ to invalid.

In a step of 303, the AF sends an application key update message (Nudm_APP_Key_Update Request) carrying the $RAND_{AF}$ to the UDM according to the user identity. In addition, if the AF is located in an operator network, the application key update message further carries the user identity (SUPI or GPSI). If the AF is a third-party application and is located outside the operator network, the AF may alternatively send an application key update message carrying a GPSI to the UDM through an NEF.

In a step of 304, the UDM initiates a UE parameter update process, for example, sends a user data management notification (Nudm_SDM_Notification) carrying re-registration indication information and application key update indication information to the AMF.

In an embodiment, the user data management notification may include a reply indication for indicating that the UE needs to return an ACK.

In a step of 305, the AMF sends a downlink NAS transport message (DL NAS

TRANSPORT) to the UE. The downlink NAS transport message includes a transparent container received from the UDM. The UE verifies update data of the UDM. If a security check on the update data of the UDM is successful, the UE may update the application key according to the update data. If the security check fails, the UE discards contents of the update data.

In a step of 306, if the UE has determined the update data and the UDM has requested the UE to send an ACK to the UDM, the UE sends an uplink NAS transport message (UL NAS TRANSPORT), which carries a transparent container including the ACK, to the AMF.

In a step of 307, the UE changes the ngKSI to invalid, i.e., changes the ngKSI to 7. If the UE does not need to return an ACK, the UE may carry the ngKSI to initiate a re-registration process to the network according to the re-registration indication after returning to an idle state.

If the UE needs to return an ACK, the UE may carry the ngKSI to initiate a re-registration process to the network after step 309 and after the UE receives an application session establishment failure message.

In a step of 308, if the uplink NAS transport message received by the AMF carries the ACK, the AMF sends a user data management response message (Nudm_SDM_Info), which carries a transparent container including the ACK, to the UDM.

In a step of 309, the UDM returns an application key update response message (Nudm_APPKey_Update Response) to the AF (through an NEF or not).

After receiving the application key update response message, the AF sends an application session establishment failure message to the UE. It should be noted that after the re-registration process, new $K_{AKMA}'$, A-KID', and $K_{AF}'$ are generated. After completing the re-registration, the UE may use A-KID' to re-initiate an application session establishment request.

It can be understood that steps 306 and 308 may be omitted if the user data management notification does not include the reply indication.

In an embodiment of the present disclosure, a key update method is further provided. The method may be applied to a second network element. The second network element is a network element for storing user subscription data, such as a UDM.

Figure 5:
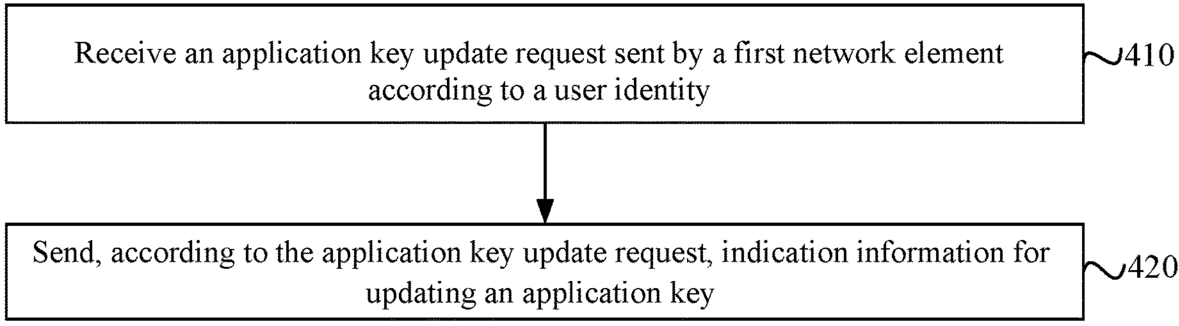
FIG. 5 is a flowchart of another key update method according to an embodiment.

FIG. 5 is a flowchart of another key update method according to an embodiment. As shown in FIG. 5, the method provided in this embodiment includes the following steps 410 to 420.

In a step of 410, an application key update request sent by a first network element according to a user identity is received.

In this embodiment, the UE initiates a session establishment request carrying a key identifier A-KID to a first network element, and the first network element may query a corresponding application key $K_{AF}$ according to the A-KID. When $K_{AF}$ is invalid, the first network element sends an application key update request to the second network element. The application key update request carries a user identity for identifying the UE that requests to establish an application session. After receiving the application key update request, the second network element instructs the corresponding UE to update $K_{AF}$. The user identity may be an SUPI or a GPSI.

In a step of 420, indication information for updating an application key is sent according to the application key update request.

In this embodiment, the indication information for updating the application key is configured to instruct the corresponding UE to update $K_{AF}$. For example, the corresponding UE may be instructed through the AMF to update $K_{AF}$.

According to the key update method of this embodiment, when the application key is invalid, a UE is instructed to update $K_{AF}$ according to the application key update request from the first network element, thereby ensuring the security of the application session and the service reliability.

In an embodiment, sending, according to the application key update request, indication information for updating an application key includes: sending a user data management notification to an AMF network element according to the application key update request, and sending a downlink NAS transport message to a UE through the AMF network element.

In this embodiment, the second network element instructs, for example, through the AMF, the UE to update $K_{AF}$. Sending the indication information for updating the application key may mean that the second network element sends a user data management notification to the AMF. The user data management notification may carry a key update parameter $RAND_{AF}$ generated by the first network element, in order to instruct the UE to update $K_{AF}$ according to the key update parameter. Alternatively, the user data management notification may carry re-registration indication information and application key update indication information, in order to instruct the UE to initiate a re-registration process and obtain new A-KID' and $K_{AF}$'. In addition, the user data management notification may further carry a reply indication indicating that the UE needs to return acknowledgment information.

In an embodiment, the application key update request includes a key update parameter generated by the first network element. The user data management notification includes the key update parameter. The downlink NAS transport message is configured to instruct the UE to update the application key according to the key update parameter.

In this embodiment, the first network element generates a key update parameter $RAND_{AF}$ for updating an application key, and the key update parameter is carried in an application key update request. Based on this, the second network element can notify the AMF of the key update parameter through a user data management notification. The AMF notifies the UE of the key update parameter through a downlink NAS transport message, such that the UE updates $K_{AF}$ based on the key update parameter (see steps 203 to 206 in FIG. 3), thereby ensuring that the application key used by the UE is consistent with the application key used by the first network element.

In an embodiment, the user data management notification further includes a reply indication of returning acknowledgment information. The method further includes the following steps.

In a step of 4310, a user data management response message sent by the AMF is received. The user data management response message is sent by the AMF after an uplink NAS transport message is received from the UE, and the uplink NAS transport message includes acknowledgment information returned by the UE.

In a step of 4320, an application key update response message is sent to the first network element. The application key update response message is configured to instruct the first network element to determine an updated application key based on the key update parameter.

In this embodiment, the user data management notification further includes a reply indication. After the second network element notifies the UE of the key update parameter through the AMF, the UE updates $K_{AF}$ using the key update parameter, and returns acknowledgment information to the AMF through an uplink NAS transport message. Then, the AMF may send a user data management response message to the second network element. After receiving the user data management response message, the second network element may send an application key update response message to the first network element to instruct the first network element to update $K_{AF}$ using the key update parameter (see steps 207 to 211 in FIG. 3).

In an embodiment, the user data management notification includes re-registration indication information and application key update indication information. The downlink NAS transport message is configured to instruct the UE to initiate a re-registration process and obtain an updated application key.

In this embodiment, the user data management notification includes re-registration indication information and application key update indication information. The re-registration indication information is configured to instruct the UE to initiate a re-registration process. New $K_{AKMA}$', A-KID', and $K_{AF}$' are generated in the re-registration process. The application key update indication information is configured to instruct the UE to acquire $K_{AF}$'. Based on this, the UE may re-initiate an application session establishment request using A-KID'. For example, the second network element may send the re-registration indication information and the application key update indication information to the AMF through the user data management notification. The AMF sends the re-registration indication information and the application key update indication information to the UE through the downlink NAS transport message, in order to instruct the UE to initiate a re-registration process and obtain an updated application key (see steps 304 to 305 in FIG. 4), thereby ensuring that the application key used by the UE is consistent with the application key used by the first network element.

In this embodiment, before initiating the re-registration process, the UE may set a key set identity (ngKSI) to a specified value, which is configured to indicate that an application key is invalid or a network layer key is invalid.

In an embodiment, the user data management notification further includes a reply indication of returning acknowledgment information. The method further includes the following steps.

In a step of 4410, a user data management response message sent by the AMF is received. The user data management response message is sent by the AMF after an uplink NAS transport message is received from the UE, and the uplink NAS transport message includes acknowledgment information.

In a step of 4420, an application key update response message is sent to the first network element. The application key update response message is configured to instruct the first network element to return a session establishment failure message to the UE, and receive a session establishment request re-initiated by the UE.

In this embodiment, the user data management notification further includes a reply indication. After the second network element sends the re-registration indication information and the application key update indication information to the UE through the AMF, the UE initiates a re-registration process to obtain an updated application key, and returns acknowledgment information to the AMF through an uplink NAS transport message. Then, the AMF may send a user data management response message to the second network element. After receiving the user data management response message, the second network element may send an application key update response message to the first network element to inform the first network element an acknowledgment that the UE has initiated the re-registration process (see steps 306 to 309 in FIG. 4).

Figure 6:
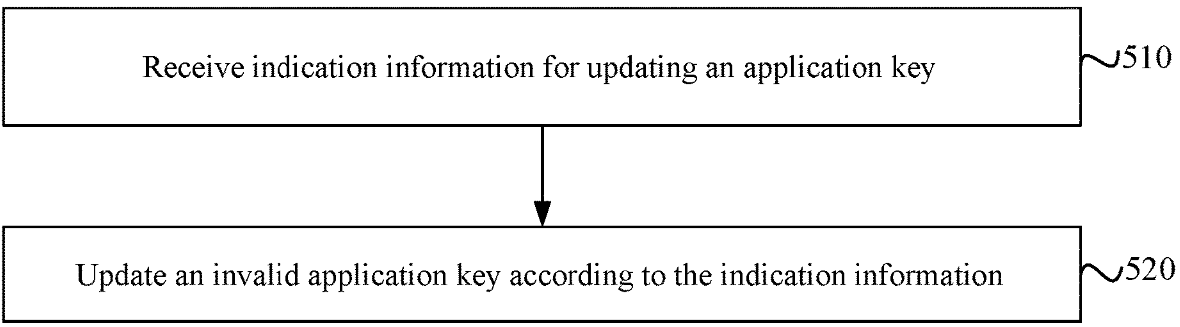
FIG. 6 is a flowchart of still another key update method according to an embodiment.

In an embodiment of the present disclosure, a key update method is provided. The method may be applied to a UE. FIG. 6 is a flowchart of still another key update method according to an embodiment. As shown in FIG. 6, the method provided in this embodiment includes the following steps 510 to 520.

In a step of 510, indication information for updating an application key is received.

In a step of 520, an invalid application key is updated according to the indication information.

In this embodiment, the UE can update the invalid application key according to the indication information for updating the application key, and the updated application key can ensure the security of the application session and the service reliability. The indication information for updating the application key may be sent to the UE by the second network element through the AMF. The indication information may carry a key update parameter $RAND_{AF}$ generated by the first network element, such that the UE updates $K_{AF}$ according to the key update parameter. Alternatively, the indication information may carry re-registration indication information and application key update indication information, such that the UE initiates a re-registration process and obtains a new application key according to the re-registration indication information and the application key update indication information. In addition, the indication information may further carry a reply indication indicating that the UE needs to return acknowledgment information.

In an embodiment, receiving indication information for updating an application key includes: receiving a downlink NAS transport message sent by an AMF network element. The downlink NAS transport message is sent by the AMF according to a user data management notification from the second network element.

In an embodiment, the downlink NAS transport message includes a key update parameter generated by a first network element.

In the step of 520, updating an invalid application key according to the indication information includes a following step.

An operation is performed using a key generation function to obtain an updated application key according to the key update parameter and the invalid application key.

In this embodiment, the first network element generates a key update parameter $RAND_{AF}$ for updating an application key, and the key update parameter is carried in an application key update request. Based on this, the second network element may notify the AMF of the key update parameter through a user data management notification, and the AMF notifies the UE of the key update parameter through a downlink NAS transport message, such that the UE updates $K_{AF}$ based on the key update parameter (see steps 203 to 206 in FIG. 3). For example, the UE may perform an operation according to the invalid $K_{AF}$ and $RAND_{AF}$ by using a key generation function KDF that generates $K_{AF}$ based on $K_{AKMA}$, to obtain an updated application key $K_{AF}'$. In this way, it is ensured that the application key used by the UE is consistent with the application key used by the first network element.

In an embodiment, the downlink NAS transport message includes re-registration indication information and application key update indication information.

Additionally, the downlink NAS transport message is configured to instruct the UE to initiate a re-registration process and obtain an updated application key.

In this embodiment, the user data management notification includes the re-registration indication information and the application key update indication information. The re-registration indication information is configured to instruct the UE to initiate a re-registration process. New $K_{AKMA}'$, A-KID', and $K_{AF}'$ are generated in the re-registration process. The application key update indication information is configured to instruct the UE to acquire $K_{AF}'$. Based on this, the UE may re-initiate an application session establishment request by using A-KID'. For example, the second network element may send the re-registration indication information and the application key update indication information to the AMF through the user data management notification, and the AMF sends the re-registration indication information and the application key update indication information to the UE through the downlink NAS transport message, in order to instruct the UE to initiate a re-registration process and obtain an updated application key $K_{AF}$ (see steps 304 to 305 in FIG. 4), thereby ensuring that the application key used by the UE is consistent with the application key used by the first network element.

In an embodiment, the downlink NAS transport message further includes a reply indication of returning acknowledgment information. The method further includes a following step. In a step of 512, an uplink NAS transport message is sent to the AMF network element. The uplink NAS transport message includes the acknowledgment information returned by the UE.

In this embodiment, if the user data management notification sent by the second network element to the AMF includes a reply indication, the uplink NAS transport message sent by the UE to the AMF network element includes acknowledgment information (ACK).

In an embodiment, updating an invalid application key according to the indication information includes the following steps.

In a step of 5210, a key set identity is set to a specified value, which is configured to indicate that an application key is invalid or a network layer key is invalid. The network layer key includes an intermediate key or a NAS key.

In a step of 5220, a re-registration process is initiated according to the key set identity and an updated application key is obtained when the UE is in an idle state.

In this embodiment, the UE sets a key set identity ngSKI to a specified value of 7, to indicate that the application key $K_{AF}$ is invalid or the network layer key (an intermediate key $K_{AUSF}$ or a NAS key) is invalid. When the user data management notification does not contain the reply indication, the UE does not need to return acknowledgment information, and may initiate a re-registration process according to the key set identity and obtain an updated application key after returning to the idle state.

In an embodiment, updating an invalid application key according to the indication information includes the following steps.

In a step of 5230, a key set identity is set to a specified value, which is configured to indicate that a network key is invalid or a network layer key is invalid. The network layer key includes an intermediate key or a NAS key.

In a step of 5240, a re-registration process is initiated according to the key set identity and an updated application key is obtained when a session establishment failure message returned by a first network element is received.

In this embodiment, the UE sets the key set identity ngSKI to a specified value of 7, to indicate that the application key $K_{AF}$ is invalid or the network layer key (the intermediate key $K_{AUSF}$ or the NAS key) is invalid. When the user data management notification includes the reply indication, the UE needs to return acknowledgment information. For example, the UE may send an ACK to the AMF through an uplink NAS transport message. The AMF sends a user data management response message to the second network element. The second network element sends an application key update response message to the first network element (see steps 306 to 309 in FIG. 4). After determining that the UE is about to initiate a re-registration process, the first network element may send a session establishment failure message to the UE. Then the UE may initiate a re-registration process according to the key set identity and obtain an updated application key.

Figure 7:
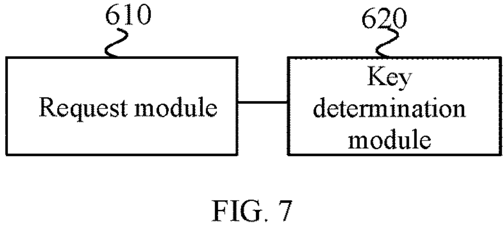
FIG. 7 is a schematic structural diagram of a key update apparatus according to an embodiment.

An embodiment of the present disclosure provides a key update apparatus. FIG. 7 is a schematic structural diagram of a key update apparatus according to an embodiment. As shown in FIG. 7, the key update apparatus includes a plurality of following modules.

A request module 610 is configured to send an application key update request to a second network element according to a user identity when an application key corresponding to a key identifier carried in a session establishment request is invalid.

A key determination module 620 is configured to determine an updated application key according to a message associated with the application key update request.

When an application key is invalid, the key update apparatus of this embodiment may request the second network element for an updated application key, and determine the updated application key according to the message associated with the application key update request, thereby ensuring the security of the application session and the service reliability.

In an embodiment, the apparatus further includes a following module.

A generation module is configured to generating a key update parameter, which is carried in the application key update request.

In an embodiment, the message associated with the application key update request includes an application key update response message sent by the second network element.

The key determination module 620 is further configured to perform the following step.

The updated application key is determined based on the key update parameter when the application key update response message sent by the second network element is received.

In an embodiment, the key determination module 620 is further configured to perform the following step.

An operation is performed using a key generation function to obtain the updated application key according to the key update parameter and the invalid application key.

In an embodiment, the apparatus further includes a following module.

A configuration module is configured to configuring a validity period for the updated application key.

In an embodiment, the key update parameter is a random number generated by a hash function.

In an embodiment, the request module 610 is further configured to send the application key update request to the second network element through a NEF network element when the first network element is located outside an operator network.

In an embodiment, the message associated with the application key update request includes a session establishment request message re-initiated by a user equipment.

The key determination module 620 is further configured to query the updated application key according to the re-initiated session establishment request message.

In an embodiment, the apparatus further includes a failure message sending module configured to send a session establishment failure message to the UE when an application key update response message sent by the second network element is received.

The key update apparatus provided in this embodiment and the key update method provided in the above embodiments belong to the identical inventive concept. For technical details that are not described in detail in this embodiment, reference may be made to any of the above embodiments. This embodiment has the identical beneficial effects as those obtained from execution of the key update method.

Figure 8:
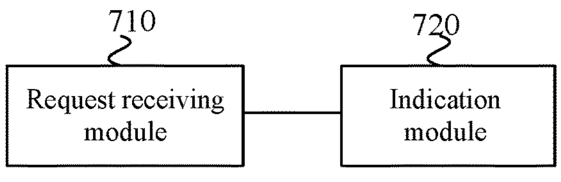
FIG. 8 is a schematic structural diagram of another key update apparatus according to an embodiment.

An embodiment of the present disclosure further provides a key update apparatus. FIG. 8 is a schematic structural diagram of another key update apparatus according to an embodiment. As shown in FIG. 8, the key update apparatus includes a plurality of following modules.

A request receiving module 710 is configured to receive an application key update request sent by a first network element according to a user identity.

An indication module 720 is configured to send, according to the application key update request, indication information for updating an application key.

When the application key is invalid, the key update apparatus of this embodiment instructs a UE to update $K_{AF}$ according to the application key update request from the first network element, thereby ensuring the security of the application session and the service reliability.

In an embodiment, the indication module 720 is further configured to send a user data management notification to an AMF network element according to the application key update request, and send a downlink NAS transport message to a UE through the AMF network element.

In an embodiment, the application key update request includes a key update parameter generated by the first network element. The user data management notification includes the key update parameter. The downlink NAS transport message is configured to instruct the UE to update the application key according to the key update parameter.

In an embodiment, the user data management notification further includes a reply indication of returning acknowledgment information.

The apparatus further includes a plurality of following modules.

A first receiving module is configured to receive a user data management response message sent by the AMF. The user data management response message is sent by the AMF after an uplink NAS transport message is received from the UE, and the uplink NAS transport message includes acknowledgment information returned by the UE.

A first sending module is configured to send an application key update response message to the first network element. The application key update response message is configured to instruct the first network element to determine an updated application key based on the key update parameter.

In an embodiment, the user data management notification includes re-registration indication information and application key update indication information.

Additionally, the downlink NAS transport message is configured to instruct the UE to initiate a re-registration process and obtain an updated application key.

In an embodiment, the user data management notification further includes a reply indication of returning acknowledgment information, and the apparatus further includes a plurality of following modules.

A second receiving module is configured to receive a user data management response message sent by the AMF. The user data management response message is sent by the AMF after an uplink NAS transport message is received from the UE, and the uplink NAS transport message includes acknowledgment information.

A second sending module is configured to send an application key update response message to the first network element. The application key update response message is configured to instruct the first network element to return a session establishment failure message to the UE and receive a session establishment request re-initiated by the UE.

The key update apparatus provided in this embodiment and the key update method provided in the above embodiments belong to the identical inventive concept. For technical details that are not described in detail in this embodiment, reference may be made to any of the above embodiments. This embodiment has the identical beneficial effects as those obtained from execution of the key update method.

Figure 9:
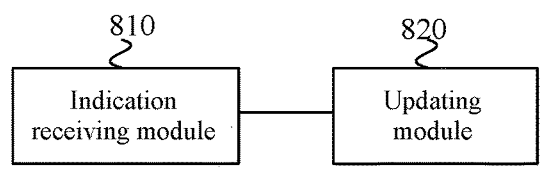
FIG. 9 is a schematic structural diagram of still another key update apparatus according to an embodiment.

An embodiment of the present disclosure provides a key update apparatus. FIG. 9 is a schematic structural diagram of still another key update apparatus according to an embodiment. As shown in FIG. 9, the key update apparatus includes a plurality of following modules.

An indication receiving module 810 is, configured to receive indication information for updating an application key.

An updating module 820 is configured to update an invalid application key according to the indication information.

The key update apparatus of this embodiment can update the invalid application key according to the indication information for updating the application key, and the updated application key can ensure the security of the application session and the service reliability.

In an embodiment, the indication receiving module 810 is further configured to receive a downlink NAS transport message sent by an AMF network element. The downlink NAS transport message is sent by the AMF according to a user data management notification from the second network element.

In an embodiment, the downlink NAS transport message includes a key update parameter generated by a first network element.

The updating module 820 is further configured to perform an operation using a key generation function to obtain an updated application key according to the key update parameter and the invalid application key.

In an embodiment, the downlink NAS transport message includes re-registration indication information and application key update indication information.

Additionally, the downlink NAS transport message is configured to instruct the UE to initiate a re-registration process and obtain an updated application key.

In an embodiment, the downlink NAS transport message further includes a reply indication of returning acknowledgment information. and the apparatus further includes a following module.

An acknowledgment module is, configured to send an uplink NAS transport message to the AMF network element. The uplink NAS transport message includes the acknowledgment information returned by the UE.

In an embodiment, the updating module 820 includes a plurality of following sub-modules.

A first setting module is configured to set a key set identity to a specified value, which is configured to indicate that an application key is invalid or a network layer key is invalid. The network layer key includes an intermediate key or a NAS key; and A first re-registration module is configured to initiate a re-registration process according to the key set identity and obtaining an updated application key when the UE is in an idle state.

In an embodiment, the updating module 820 includes a plurality of following sub-modules.

A second setting module is configured to set a key set identity to a specified value, which is configured to indicate that a network key is invalid or a network layer key is invalid. The network layer key includes an intermediate key or a NAS key.

A second re-registration module is configured to initiate a re-registration process according to the key set identity and obtaining an updated application key when a session establishment failure message sent returned by a first network element is received.

The key update apparatus provided in this embodiment and the key update method provided in the above embodiments belong to the identical inventive concept. For technical details that are not described in detail in this embodiment, reference may be made to any of the above embodiments. This embodiment has the identical beneficial effects as those obtained from execution of the key update method.

Figure 10:
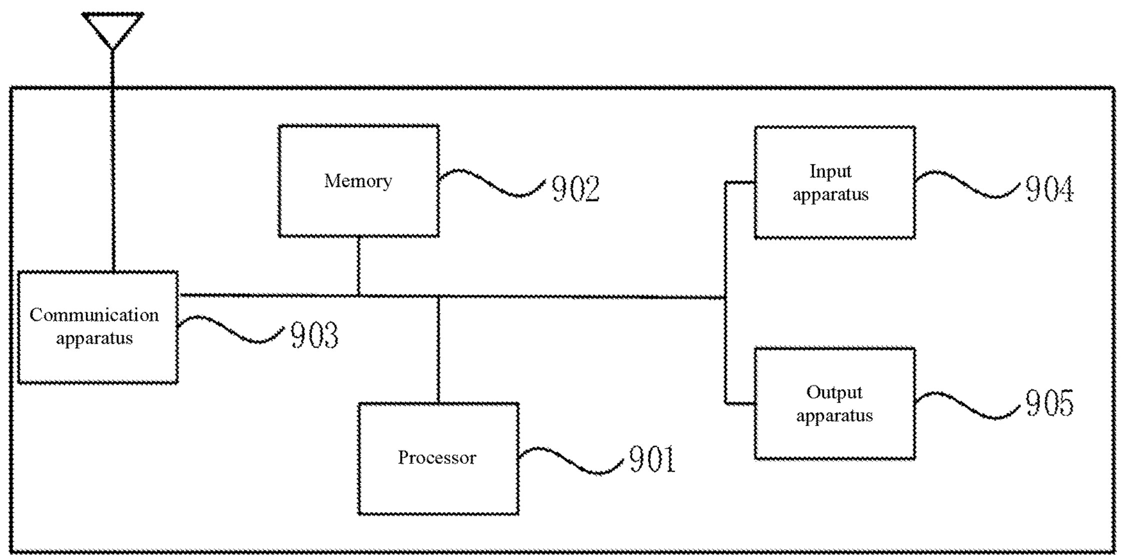
FIG. 10 is a schematic structural diagram of hardware of a network element according to an embodiment.

An embodiment of the present disclosure provides a network element. FIG. 10 is a schematic structural diagram of hardware of a network element according to an embodiment. As shown in FIG. 10, the network element provided by the present disclosure includes a memory 902, a processor 901, and a computer program stored in the memory and executable by the processor, where the computer program, when executed by the processor 901, causes the processor 901 to implement the key update method applied to a first network element or the key update method applied to a second network element.

The network element may further include a memory 902. The number of processors 901 in the network element may be one or more. One processor 901 is used as an example in FIG. 10. The memory 902 is configured to store one or more programs which, when executed by the one or more processors 901, cause the one or more processors 901 to implement the key update method applied to a first network element or the key update method applied to a second network element according to the embodiments of the present disclosure.

The network element further includes a communication apparatus 903, an input apparatus 904, and an output apparatus 905.

The processor 901, the memory 902, the communication apparatus 903, the input apparatus 904, and the output apparatus 905 in the network element may be connected by a bus or in other ways. Connection by a bus is used as an example in FIG. 10.

The input apparatus 904 may be configured to receive inputted numerical or character information, and generate a key signal input related to user settings and function control of the network element. The output apparatus 905 may include a display device such as a display screen.

The communication apparatus 903 may include a receiver and a transmitter. The communication apparatus 903 is configured to transmit and receive information under the control of the processor 901.

The memory 902, as a computer-readable storage medium, may be configured to store a software program, a computer-executable program, and modules, for example, program instructions/modules corresponding to the key update method in the embodiments of the present disclosure (for example, the request module 610 and the key determination module 620 in the key update apparatus). The memory 902 may include a program storage area and a data storage area. The program storage area may store an operating system, and an application required by at least one function. The data storage area may store data created according to the use of the network element and the like. In addition, the memory 902 may include a high-speed random access memory, and may also include a nonvolatile memory, e.g., at least one magnetic disk storage device, flash memory device, or other nonvolatile solid-state storage device. In some examples, the memory 902 may include memories located remotely from the processor 901, and the remote memories may be connected to the network element via a network. Examples of the network include, but not limited to, the Internet, an intranet, a local area network, a mobile communication network, and combinations thereof.

Figure 11:
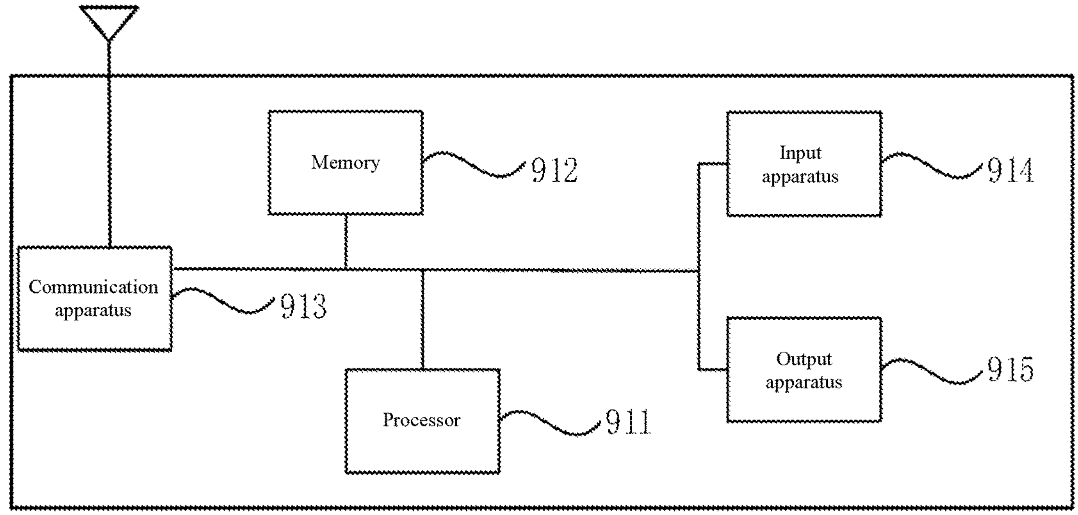
FIG. 11 is a schematic structural diagram of hardware of a user equipment according to an embodiment.

An embodiment of the present disclosure provides a UE. FIG. 11 is a schematic structural diagram of hardware of a UE according to an embodiment. As shown in FIG. 11, the UE provided by the present disclosure includes a memory 912, a processor 911, and a computer program stored in the memory and executable by the processor, where the computer program, when executed by the processor 911, causes the processor 911 to implement the key update method applied to the UE.

The UE may further include a memory 912. The number of processors 911 in the UE may be one or more. One processor 911 is used as an example in FIG. 11. The memory 912 is configured to store one or more programs which, when executed by the one or more processors 911, cause the one or more processors 911 to implement the key update method applied to the UE according to the embodiments of the present disclosure.

The UE further includes a communication apparatus 913, an input apparatus 914, and an output apparatus 915.

The processor 911, the memory 912, the communication apparatus 913, the input apparatus 914, and the output apparatus 915 in the UE may be connected by a bus or in other ways. Connection by a bus is used as an example in FIG. 11.

The input apparatus 914 may be configured to receive inputted numerical or character information, and generate a key signal input related to user settings and function control of the UE. The output apparatus 915 may include a display device such as a display screen.

The communication apparatus 913 may include a receiver and a transmitter. The communication apparatus 913 is configured to transmit and receive information under the control of the processor 911.

The memory 912, as a computer-readable storage medium, may be configured to store a software program, a computer-executable program, and modules, for example, program instructions/modules corresponding to the key update method in the embodiments of the present disclosure (for example, the indication receiving module 810 and the updating module 820 in the key update apparatus). The memory 912 may include a program storage area and a data storage area. The program storage area may store an operating system, and an application required by at least one function. The data storage area may store data created according to the use of the UE and the like. In addition, the memory 912 may include a high-speed random access memory, and may also include a nonvolatile memory, e.g., at least one magnetic disk storage device, flash memory device, or other nonvolatile solid-state storage device. In some examples, the memory 912 may include memories located remotely from the processor 911, and the remote memories may be connected to the UE via a network. Examples of the network include, but not limited to, the Internet, an intranet, a local area network, a mobile communication network, and combinations thereof.

An embodiment of the present disclosure provides a storage medium, storing a computer program which, when executed by a processor, causes the processor to implement the key update method according to any one of the embodiments of the present disclosure. The method includes: sending an application key update request to a second network element according to a user identity when an application key corresponding to a key identifier carried in a session establishment request is invalid; and determining an updated application key according to a message associated with the application key update request.

Alternatively, the method includes: receiving an application key update request sent by a first network element according to a user identity; and sending, according to the application key update request, indication information for updating an application key.

Alternatively, the method includes: receiving indication information for updating an application key; and updating an invalid application key according to the indication information.

The computer-readable storage medium in the embodiment of the present disclosure may be any combination of one or more computer-readable media. The computer-readable medium may be a computer-readable signal medium or a computer-readable storage medium. For example, the computer-readable storage medium may include, but not limited to, an electrical, magnetic, optical, electromagnetic, infrared, or semiconductor system, apparatus, or device, or any combination thereof. Specific examples (non-exclusive list) of the computer-readable storage medium include: electrical connection having one or more wires, portable computer disk, hard disk, Random Access Memory (RAM), Read-Only Memory (ROM), Erasable Programmable Read-Only Memory (EPROM), flash memory, optical fiber, portable Compact Disc Read-Only Memory (CD-ROM), optical storage device, magnetic storage device, or any suitable combination thereof. The computer-readable storage medium may be any tangible medium containing or storing a program that may be used by or in combination with an instruction execution system, apparatus, or device.

The computer-readable signal medium may include a data signal propagated in a baseband or as part of a carrier. The data signal carries computer-readable program code. Such a propagated data signal may be in a variety of forms including, but not limited to, an electromagnetic signal, an optical signal, or any suitable combination thereof. The computer-readable signal medium may also be any computer-readable medium other than a computer-readable storage medium, and may send, propagate, or transmit a program for use by or in combination with an instruction execution system, apparatus, or device.

The program code contained on the computer-readable medium may be transmitted using any suitable medium, including but not limited to, via wireless transmission, via a wire, via a fiber optic cable, via Radio Frequency (RF), etc., or any suitable combination thereof.

Computer program code for executing the operations of the present disclosure may be compiled in one or more programming languages or a combination of programming languages, including object-oriented programming languages such as Java, Smalltalk, and C++, and conventional procedural programming languages such as the "C" language or similar programming languages. The program code can be entirely executed on a user's computer, partly executed on the user's computer, executed as a separate software package, partly executed on the user's computer, and partly executed on a remote computer, or entirely executed on a remote computer or server. In cases involving a remote computer, the remote computer may be connected to the user's computer via any type of network, including a Local Area Network (LAN) or a Wide Area Network (WAN), or may be connected to an external computer (e.g., via an Internet service provided by an Internet service provider).

The above description is only example embodiments of the present disclosure, and is not intended to limit the scope of the present disclosure.

As will be understood by those having ordinary skills in the art, the term user terminal encompasses any suitable type of wireless UE, such as a mobile telephone, portable data processing device, portable web browser or vehicle-mounted mobile station.

In general, the various embodiments of the present disclosure may be implemented in hardware or special purpose circuits, software, logic, or any combination thereof. For example, some aspects may be implemented in hardware, while other aspects may be implemented in firmware or software that can be executed by a controller, a microprocessor or other computing devices, but the present disclosure is not limited thereto.

The embodiments of the present disclosure may be implemented by the execution of computer program instructions by a data processor of a mobile device, for example, in a processor entity, or by hardware, or by a combination of software and hardware. The computer program instructions may be assembly instructions, Instruction Set Architecture (ISA) instructions, machine instructions, machine dependent instructions, microcode, firmware instructions, state setting data, or source code or object code written in any combination of one or more programming languages.

The block diagram of any logic flow in the accompanying drawings of the present disclosure may represent program steps, or may represent interconnected logic circuits, modules and functions, or may represent a combination of program steps and logic circuits, modules and functions. The computer program may be stored in a memory. The memory may be of any type suitable for the local technical environment and may be implemented using any suitable data storage technology, such as, but not limited to, Read-Only Memory (ROM), Random Access Memory (RAM), and optical storage devices and systems (Digital Video Disc (DVD) or Compact Disk (CD)), etc. The computer-readable medium may include a non-transitory storage medium. The data processor may be of any type suitable for the local technical environment, such as, but not limited to, a general-purpose computer, a special purpose computer, a microprocessor, a Digital Signal Processor (DSP), an Application Specific Integrated Circuit (ASIC), a programmable logic device (Field-Programmable Gate Array, FPGA), and a processor based on a multi-core processor architecture.

The foregoing has provided a detailed description of the present disclosure by way of example and non-limiting embodiments. However, various modifications and adjustments to the above embodiments are obvious to those having ordinary skills in the art in light of the accompanying drawings and the claims, but do not depart from the scope of the present disclosure. Therefore, the proper scope of the present disclosure will be defined by the claims.

What is claimed is:

1. A key update method, applied to an Application Function (AF) network element, comprising:

sending an application key update request to a Unified Data Management (UDM) network element according to a user identity in response to an application key corresponding to a key identifier carried in a session establishment request being invalid, wherein the message associated with the application key update request comprises a session establishment request message re-initiated by a user equipment;

sending a session establishment failure message to the user equipment in response to receiving an application key update response message sent by the UDM; and determining an updated application key according to a message associated with the application key update request, comprising:

querying the updated application key according to the re-initiated session establishment request message.

2. The method of claim 1, further comprising:

generating a key update parameter, wherein the key update parameter is carried in the application key update request.

3. The method of claim 2, wherein the message associated with the application key update request comprises an application key update response message sent by the UDM; and determining an updated application key according to a message associated with the application key update request comprises:

determining the updated application key based on the key update parameter in response to receiving the application key update response message sent by the UDM.

4. The method of claim 3, wherein determining the updated application key based on the key update parameter comprises:

performing an operation using a key generation function to obtain the updated application key according to the key update parameter and an invalid application key.

5. The method of claim 2, further comprising: configuring a validity period of the updated application key.

6. The method of claim 2, wherein the key update parameter is a random number generated by a hash function.

7. The method of claim 2, wherein sending an application key update request to a UDM according to a user identity comprises:

sending the application key update request to the UDM through a Network Exposure Function (NEF) network element in response to the AF being located outside an operator network.

8. A key update method, applied to a Unified Data Management (UDM) network element, comprising:

receiving an application key update request sent by an Application Function (AF) network element according to a user identity;

sending a user data management notification to an Access Management Function (AMF) network element according to the application key update request, and sending a downlink Non-Access Stratum (NAS) transport message to a user equipment through the AMF network element;

receiving a user data management response message sent by the AMF, wherein the user data management response message is sent by the AMF after receiving an uplink NAS transport message from the user equipment, and the uplink NAS transport message comprises acknowledgment information; and sending an application key update response message to the AF, wherein the application key update response message is configured to instruct the AF to return a session establishment failure message to the user equipment and receive a session establishment request re-initiated by the user equipment;

wherein the user data management notification comprises re-registration indication information, application key update indication information, and a reply indication of returning acknowledgment information; and wherein the downlink NAS transport message is configured to instruct the user equipment to initiate a re-registration process and obtain an updated application key.

9. The method of claim 8, wherein the application key update request comprises a key update parameter generated by the AF;

the user data management notification comprises the key update parameter and a reply indication of returning acknowledgment information; and the downlink NAS transport message is configured to instruct the user equipment to update the application key according to the key update parameter; and the method further comprises:

receiving a user data management response message sent by the AMF, wherein the user data management response message is sent by the AMF after receiving an uplink NAS transport message from the user equipment, and the uplink NAS transport message comprises acknowledgment information returned by the user equipment; and sending an application key update response message to the AF, wherein the application key update response message is configured to instruct the AF to determine an updated application key based on the key update parameter.

10. A key update method, applied to a user equipment, comprising:

receiving indication information for updating an application key, comprising:

receiving a downlink Non-Access Stratum (NAS) transport message sent by an Access Management Function (AMF) network element, wherein the downlink NAS transport message is sent by the AMF according to a user data management notification from a Unified Data Management (UDM) network element; and updating an invalid application key according to the indication information, comprising:

performing an operation using a key generation function to obtain an updated application key according to the key update parameter and the invalid application key;

wherein the indication information comprises the downlink NAS transport message sent by the AMF according to the user data management notification from the UDM, and the downlink NAS transport message comprises a key update parameter generated by an Application Function (AF) network element.

11. The method of claim 10, wherein the downlink NAS transport message comprises re-registration indication information and application key update indication information; and the downlink NAS transport message is configured to instruct the user equipment to initiate a re-registration process and obtain an updated application key; and wherein updating an invalid application key according to the indication information comprises:

setting a key set identity to a specified value which is configured to indicate that an application key is invalid or a network layer key is invalid, wherein the network layer key comprises an intermediate key or a NAS key; and initiating a re-registration process according to the key set identity and obtaining an updated application key, in response to the user equipment being in an idle state, or in response to receiving a session establishment failure message sent returned by a first network element.

12. The method of claim 10, wherein the downlink NAS transport message further comprises a reply indication of returning acknowledgment information; and the method further comprises:

sending an uplink NAS transport message to the AMF network element, wherein the uplink NAS transport message comprises acknowledgment information returned by the user equipment.

13. A network element, comprising a memory, a processor, and a computer program stored in the memory and executable by the processor, wherein the computer program, when executed by the processor, causes the processor to perform the key update method of claim 1.

14. A user equipment, comprising a memory, a processor, and a computer program stored in the memory and executable by the processor, wherein the computer program, when executed by the processor, causes the processor to perform the key update method of claim 10.

15. A non-transitory computer-readable storage medium, storing a computer program which, when executed by a processor, causes the processor to perform the key update method of claim 1.

16. A network element, comprising a memory, a processor, and a computer program stored in the memory and executable by the processor, wherein the computer program, when executed by the processor, causes the processor to perform the key update method of claim 8.

17. A non-transitory computer-readable storage medium, storing a computer program which, when executed by a processor, causes the processor to perform the key update method of claim 8.

18. A non-transitory computer-readable storage medium, storing a computer program which, when executed by a processor, causes the processor to perform the key update method of claim 8.

* * * * *